(12) United States Patent
Jacot et al.

(10) Patent No.: US 11,642,749 B2
(45) Date of Patent: May 9, 2023

(54) MACHINE TOOL WITH AN OPTICAL MEASURING DEVICE FOR THREE DIMENSIONAL REGISTRATION BETWEEN THE TOOL HOLDER AND THE WORK HOLDER

(71) Applicant: Watch Out SA, Geneva (CH)

(72) Inventors: Philippe Jacot, Bevaix (CH); Sebastien Laporte, Thyez (FR); Frederic Perret, Annecy-le-Vieux (FR)

(73) Assignee: LDI FINANCES, Thyez (FR)

( * ) Notice: Subject to any disclaimer, the term of this patent is extended or adjusted under 35 U.S.C. 154(b) by 521 days.

(21) Appl. No.: 16/955,883

(22) PCT Filed: Nov. 29, 2018

(86) PCT No.: PCT/IB2018/059463
§ 371 (c)(1),
(2) Date: Jun. 19, 2020

(87) PCT Pub. No.: WO2019/123058
PCT Pub. Date: Jun. 27, 2019

(65) Prior Publication Data
US 2021/0016407 A1  Jan. 21, 2021

(30) Foreign Application Priority Data

Dec. 22, 2017 (CH) .................................... 01602/17
Dec. 22, 2017 (CH) .................................... 01603/17

(51) Int. Cl.
*G01B 5/008* (2006.01)
*B23Q 17/24* (2006.01)
(Continued)

(52) U.S. Cl.
CPC ......... *B23Q 17/2428* (2013.01); *B23Q 15/14* (2013.01); *G01C 3/08* (2013.01); *G01C 3/32* (2013.01)

(58) Field of Classification Search
CPC .................................................... B23Q 17/2428
(Continued)

(56) References Cited

U.S. PATENT DOCUMENTS 5,825,666 A  10/1998  Freifeld
5,831,734 A  11/1998  Van Tooren et al.
(Continued)

FOREIGN PATENT DOCUMENTS

CN  102476326 A  5/2012
CN  104384936 A  3/2015
(Continued)

OTHER PUBLICATIONS

Search Report for Russian Application No. 2020122231/28(038200) dated May 27, 2022.
(Continued)

*Primary Examiner* — George B Bennett
(74) *Attorney, Agent, or Firm* — Pearne & Gordon LLP

(57) ABSTRACT

A machine-tool including a machining module equipped with a tool-holder and a work-holder, and an optical measuring device-for the three-dimensional measurement of the relative position between the tool-holder and the work-holder. The optical measuring device includes an optical system mounted on the work-holder and a target mounted on the tool-holder. The target includes a useful face forming a positioning reference that can be placed in the optical axis of the optical system.

31 Claims, 9 Drawing Sheets

(51) Int. Cl.
*B23Q 15/14* (2006.01)
*G01C 3/08* (2006.01)
*G01C 3/32* (2006.01)

(58) Field of Classification Search
USPC .................................................. 33/503, 645
See application file for complete search history.

(56) References Cited

U.S. PATENT DOCUMENTS

| | | | |
|---|---|---|---|
| 9,222,769 B2* | 12/2015 | Garvey | G01B 21/16 |
| 10,508,899 B2* | 12/2019 | Jordil | G06V 10/42 |
| 10,648,792 B2* | 5/2020 | Held | G01B 11/007 |
| 10,706,562 B2* | 7/2020 | Haverkamp | G01B 5/008 |
| 2009/0172962 A1* | 7/2009 | Aubele | G01B 21/045 |
| | | | 33/556 |
| 2010/0111630 A1 | 5/2010 | Yamagishi | |
| 2011/0157603 A1 | 6/2011 | Alvarez Diez et al. | |
| 2014/0043602 A1 | 2/2014 | Engel | |
| 2014/0343890 A1 | 11/2014 | Lettau et al. | |
| 2014/0362387 A1 | 12/2014 | Yamamoto | |
| 2017/0307366 A1 | 10/2017 | Tokimitsu | |
| 2019/0064778 A1* | 2/2019 | Nakamura | G05B 19/416 |
| 2022/0250201 A1* | 8/2022 | Jacot | B23Q 17/2457 |
| 2022/0371143 A1* | 11/2022 | Horibe | B23Q 17/2442 |

FOREIGN PATENT DOCUMENTS

| | | |
|---|---|---|
| DE | 202016004237 U1 | 8/2016 |
| JP | H03281151 A | 12/1991 |
| JP | H05332743 A | 12/1993 |
| JP | H07246547 A | 9/1995 |
| JP | H1038573 A | 2/1998 |
| JP | 2003042726 A | 2/2003 |
| JP | 2003136370 A | 5/2003 |
| JP | 2008157646 A | 7/2008 |
| JP | 2010217017 A | 9/2010 |
| TW | 200419133 A | 10/2004 |
| TW | 200606391 A | 2/2006 |
| TW | 201202653 A | 1/2012 |
| TW | 201221284 A | 6/2012 |
| WO | 2006011386 A1 | 2/2006 |

OTHER PUBLICATIONS

Search Report for Taiwanese Application No. 107140440 dated Mar. 16, 2022.
Search Report for Thai Application No. 107140440 dated Mar. 16, 2022.
International Search Report for PCT/IB2018/059463 dated Feb. 4, 2019.
Written Opinion for PCT/IB2018/059463 dated Feb. 4, 2019.

* cited by examiner

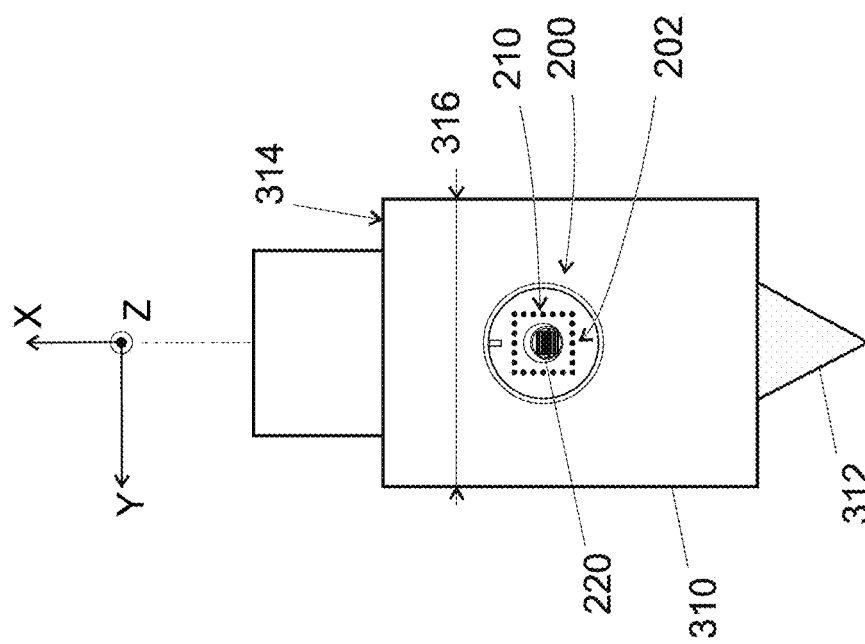

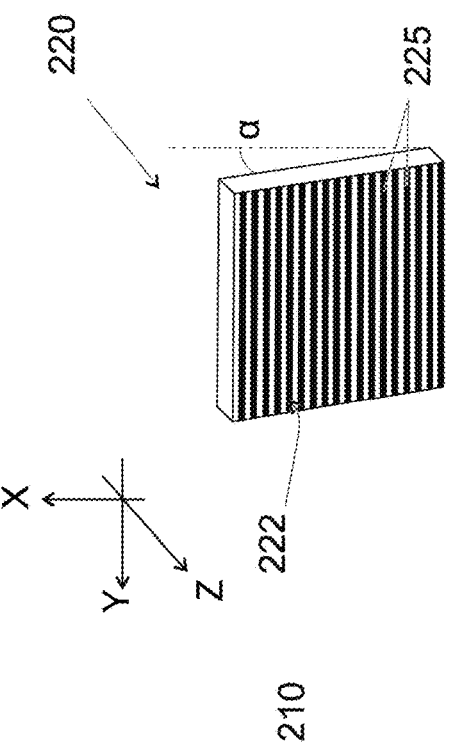
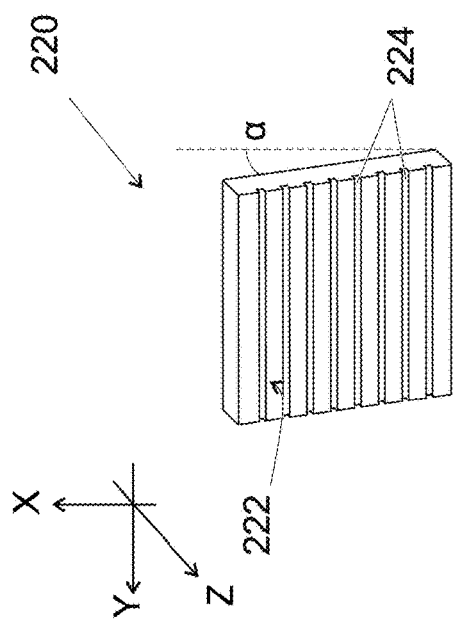
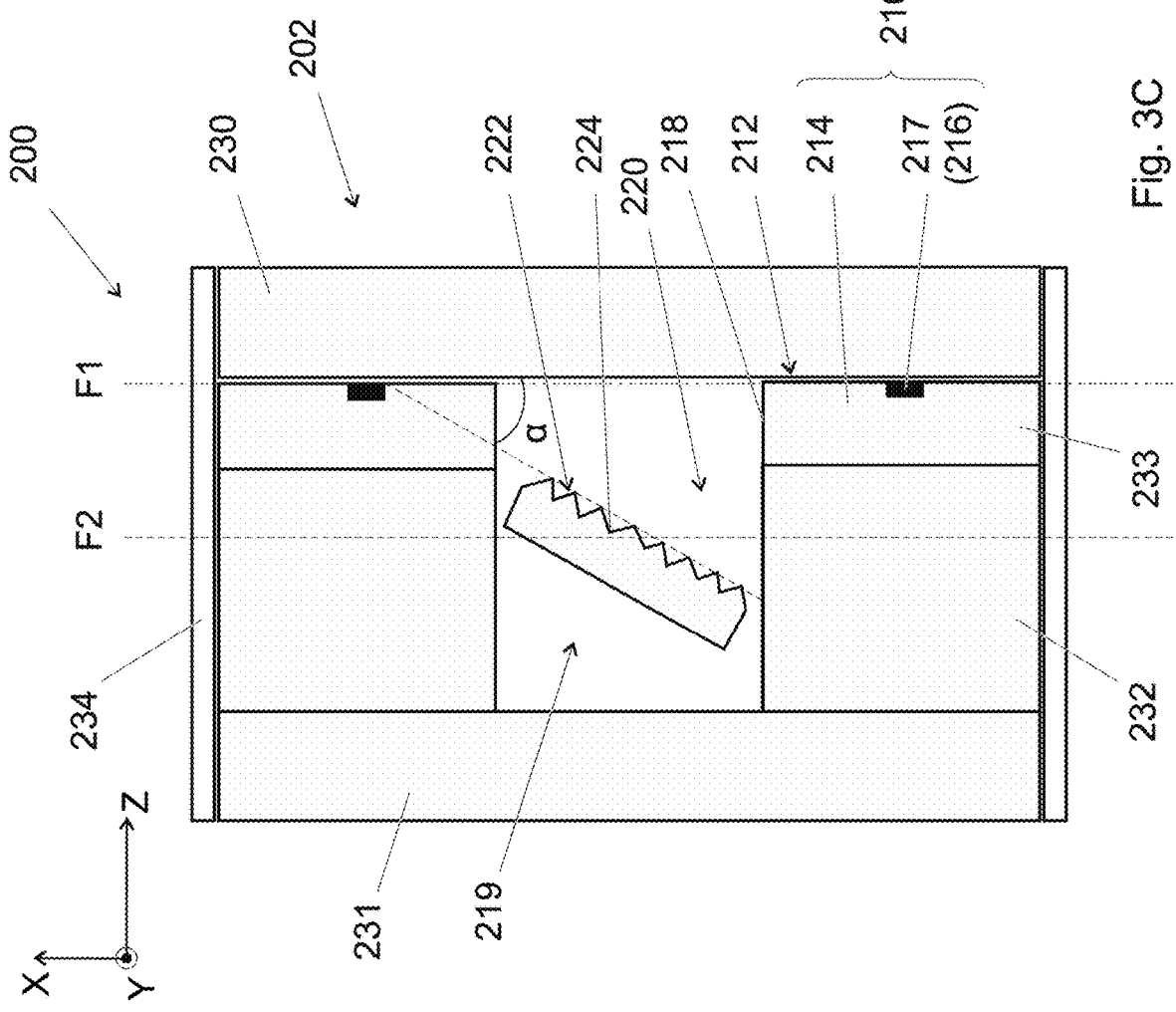

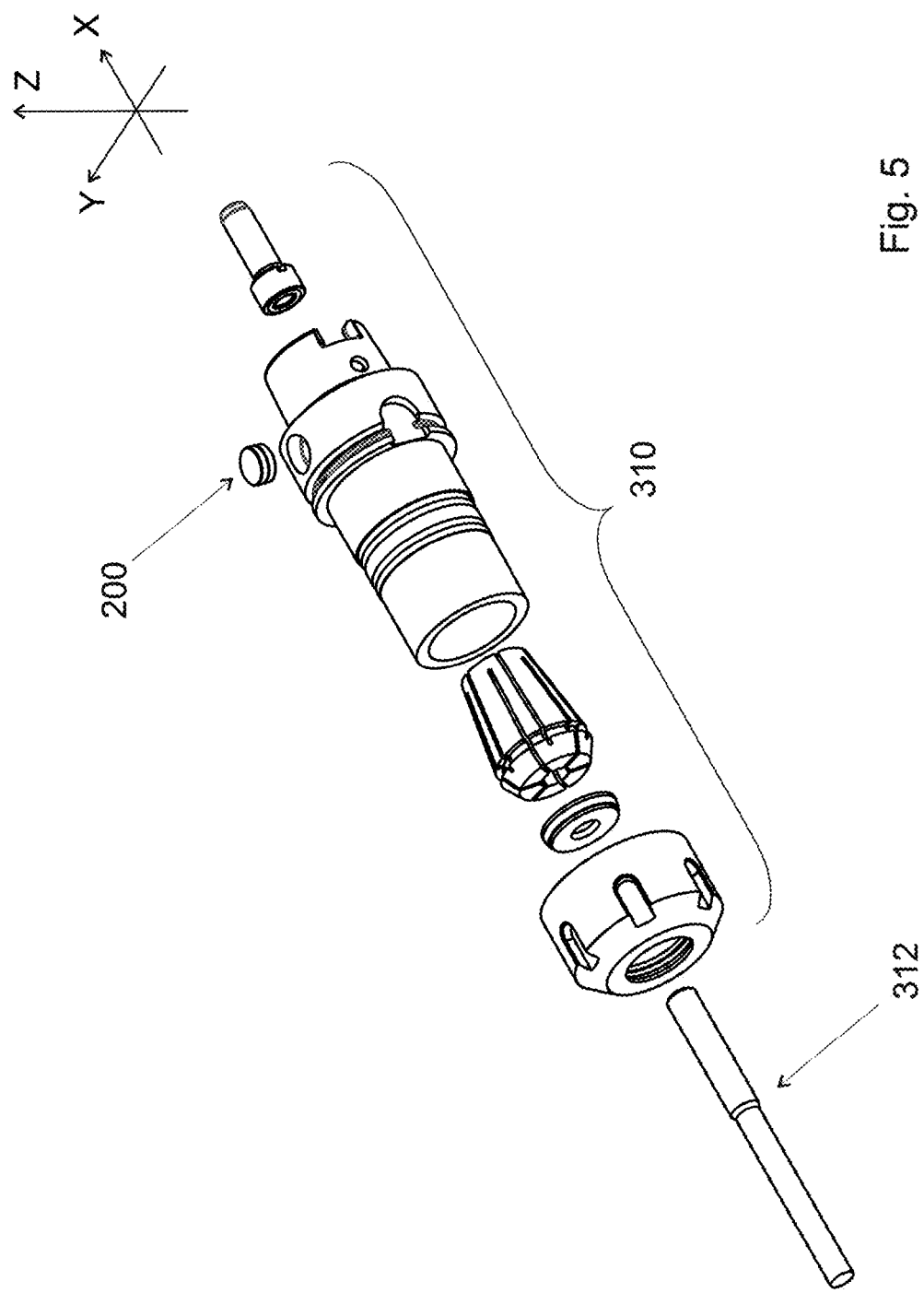

MACHINE TOOL WITH AN OPTICAL MEASURING DEVICE FOR THREE DIMENSIONAL REGISTRATION BETWEEN THE TOOL HOLDER AND THE WORK HOLDER

TECHNICAL FIELD

The present invention relates to the field of machine-tools. The present invention relates also to the field of the optical measurement of the relative position between a first object and a second object, and in particular between the tool-holder and the work-holder of a machine-tool.

In the machine-tool field, carrying out inter alia machining by material removal, there is a need to accurately know the relative position between the tool-holder and the work-holder, in order to ensure a machining range conforming to the machining plan developed during adjustment.

The production of workpieces by means of machining modules (machine-tools), in particular auto lathes, automatic turning machines, turning-milling centres, milling machines, machining centres and transfer machines, typically comprises three distinct phases.

In a first adjustment (or presetting) phase, the operator (for example an auto lathe operator) defines and tests, on a machining module, the machining plan, that is to say the succession of operations and of axis displacements necessary to obtain the desired workpiece to be machined. The operator is for example careful to obtain the most effective possible machining plan, that is to say the one which makes it possible to machine a given workpiece with a minimum of operations and avoiding collisions between tools or with the workpiece. He or she chooses the tools to be employed, and checks the quality of the workpieces obtained, for example the surface conditions, compliance with tolerances, etc.

In a second production phase, a series of workpieces are produced on the preset machining module, with the parameters defined during adjustment. This phase is the only productive phase; it is often performed 24 hours a day, the machining module being supplied with raw material by means of an automatic magazine feed or a loader of slugs (raw workpieces).

It may be that the production of a series of workpieces is interrupted, for example to replace the worn tools, to produce another type of workpiece on the same machining module, for machine maintenance etc., then subsequently restarted. In such a case, a makeready phase is necessary to apply the parameters defined previously during adjustment. This makeready phase is faster than adjustment.

During makeready, it is often necessary to replace the tools mounted on the machine with another set of tools suitable for the machining which is to be performed. The accuracy of the positioning of these tools determines the quality of the machining, but it is difficult to reproduce in successive makeready phases.

In addition, during the production phase it is not impossible to have, as the machining of new workpieces progresses, and in particular for long runs, drifts of position between the tool-holder and the work-holder, drifts which are due in particular to the thermal expansion of the machines.

STATE OF THE ART

Various solutions have therefore been proposed in the prior art in order to guarantee a correct relative positioning between the tool-holder and the work-holder during the production phase and during makeready, that is to say a relative positioning that conforms to the relative position between the tool-holder and the work-holder during adjustment.

Many in-situ measurement techniques used in machine-tools aim to measure the relative position between the workpiece or the work-holder and the tool itself. However, in this case, the measurement of the relative position between the workpiece or the work-holder and the tool is affected by the effects of the wear of the tool and of the thermal drift of the machine-tool during its operation.

Also, this type of relative position measurement is generally performed in two dimensions, that is to say in two directions, as in the document DE202016004237U.

Since this relative registration between the workpiece or the work-holder and the tool is limited to two dimensions (for example Y and X, respectively the lateral and vertical directions), it is not sufficiently comprehensive to ensure the correct relative position, such that another technique has to be used to measure the third dimension (for example Z, the direction of advance/of retraction of the work-holder, also called "material direction"). This situation increases not only the cost of the measurement technique, but also the implementation time thereof, and it also adds an error through the use of two series of measurement simultaneously.

The document US2014362387 AA discloses an optical measuring device placed on the tool-holder and that makes it possible to check that a target object does not interfere with the tool-holder. This optical measuring device uses a gauging element with several inclined parts to characterize the geometric parameters of the laser ray measuring device, in particular the position between the sensor of the reflected ray and the emitter of the incident ray. This gauging element is not involved in measuring the relative position between the tool-holder and the target object which can be a workpiece to be machined.

The document US2010111630 AA discloses a tool repositioning system for a machine-tool, comprising targets of irregular form situated on the tool and that allows for the optical measurement of the precise position of the tool by optical measuring elements whose position is not specified.

The document U.S. Pat. No. 5,831,734 describes a solution in which an optical sensor is secured to the tool-holder and performs the registration of the relative position of this tool-holder relative to a workpiece to be machined provided with a distinctive mark (groove).

The document JP07246547 proposes a machine-tool which is equipped with a reflector installed on a tool mounting shaft, and a measuring device with several laser interferometers capable of registering the position of the reflector.

These solutions do not however make it possible to be able to determine, by a single exposure step, the relative position between the workpiece to be machined and the tool, this single exposure step giving the information that makes it possible to determine this relative position in the three dimensions of space.

Nor do these solutions make it possible to become independent of the parameters that are variable in real time during the machining, in particular the wear of the tool and the thermal variations of the tool and/or of the work space of the machine-tool which receives the workpiece to be machined.

BRIEF SUMMARY OF THE INVENTION

One aim of the present invention is to propose a technology that makes it possible to perform a measurement of relative position between a tool-holder and a work-holder, that is free of the limitations of the known measurement techniques.

Another aim of the invention is to propose a technology that makes it possible to perform a measurement of relative position between a tool-holder and a work-holder, which provides the three-dimensional relative position between the first object and the second object from a single exposure step.

According to the invention, these aims are achieved in particular by means of a machine-tool comprising a machining module equipped with a tool-holder and a work-holder, and an optical measuring device for the three-dimensional measurement of the relative position between said tool-holder and said work-holder, said optical measuring device comprising an optical system with an image acquisition system, mounted on the work-holder and a target mounted on the tool-holder and comprising a useful face forming a positioning reference that can be placed in the optical axis of the optical system.

According to the invention, the optical measuring device is configured to make it possible, through a single step of exposure of the target by the optical system, to determine the three-dimensional relative position between the holder of the workpiece to be machined and the tool-holder. In this way, it is possible to obtain, through the exposure of the target performed by the optical system, the exact position between said tool-holder and said work-holder. This exposure corresponds to the taking of image(s) of the target by the optical system, namely the acquisition, the capturing or the recording of one or more images of the target. In particular, according to one possibility, the optical system is capable of simultaneously taking a first image and a second image of the target. These two images (pair of images) contain information on the relative position between the target and the optical system, which information makes it possible to obtain the relative position in the three directions of space (in particular on X, Y and Z) between the target and the optical system. According to a variant, the optical system is capable of taking a succession of pairs of images of the target.

In particular, the target is positioned such that the image focal plane of the optical system can be merged with the useful face of the target.

According to one embodiment, the target is a three-dimensional target comprising, on a useful face:
 a first structure defining a planar reference face, and
 a second structure having a face that is inclined relative to said planar reference face, and said optical system comprises a first exposure system and a second exposure system, in which the difference between the focal distance of the second exposure system and the focal distance of the first exposure system lies between the minimum distance and the maximum distance separating the reference face from the inclined face.

Thus, the optical system can simultaneously identify its position relative, on the one hand, to the reference face (or first reference face) via the image generated by the first exposure system and, on the other hand, to at least one zone of the inclined face (or second reference face) which is identified via the image generated by the first exposure system, and whose location on the target is known relative to the reference face.

This target also possibly conforms to one or other or several of the following provisions:
 the planar reference face is divided up between at least a first portion whose surface is reflective according to first reflection parameters, and a second portion whose surface is reflective according to second reflection parameters different from the first reflection parameters;
 the surface of said first portion is reflective according to a diffuse reflection, and the surface of said second portion is reflective according to a specular reflection;
 said second portion is divided up according to a series of localized zones positioned in the first portion;
 the surface of said inclined face has relief elements or else specular elements that are evenly distributed;
 the localized zones define between them a geometrical figure belonging to the following list: quadrilateral, parallelogram, rectangle, square, rhombus, regular polygon and circle;
 the localized zones of said second portion are formed by islands or segments distributed in the first portion;
 the localized zones are made of chromium;
 the first structure and the second structure are positioned on the useful face concentrically to one another, in particular the first structure surrounds the second structure;
 the localized zones of the second portion of the first structure define a square which surrounds the second structure;
 the first structure delimits an aperture for a housing housing said second structure;
 the second structure is positioned in said housing with the inclined face which is set back relative to the reference face of said first structure, in particular at the back, behind the plane delimited by the reference face;
 the surface of the inclined face of the second structure is striated, in particular the surface of the inclined face of the second structure is covered by one of the following elements: etched network, structured grid or network of specular lines.

According to one embodiment, the surface of this inclined face has evenly distributed relief elements. According to another embodiment, the surface of this inclined face has evenly distributed specular elements. In both cases, the idea is to be able to register the inclined face, which is roughly planar, in a direction Z orthogonal to the reference face. To do this, in one case, the relief elements constitute surface irregularities or roughnesses of small size, the surface of the inclined face being rough and making it possible to form a diffuse reflection which allows an optical system which looks at the target to clearly see a portion of the inclined face: in particular, these relief elements have a size greater than 700 nanometres, in particular greater than 1 micrometre, namely of a size greater than the wavelength of the incident radiation, here natural light. In the other case, the specular elements of the inclined face, positioned according to a geometrical arrangement, for example in mutually parallel lines and positioned at different positions according to the direction Z, are visually distinguished from the rest of the surface of the inclined face (which is preferably reflective according to a diffuse reflection), hence the possibility for an optical system which looks at the target to clearly see a portion of the inclined face with one or more of these specular elements.

This three-dimensional target has, on its side forming the useful face, a dual structure, respectively defining a first planar reference face and a second reference face, defining a plane that is inclined relative to the first reference face. This three-dimensional geometry of the target, allied with specific and different optical characteristics of the surfaces that respectively make up the first reference face and the second reference face, allow for an optical registration in the three dimensions X, Y and Z of space of this target relative to the optical system used. In one embodiment, this optical system makes it possible to perform this optical registration, namely culminating in the measurement of relative position, by virtue of a single step of exposure both of the first planar reference face and of the second inclined reference face: it therefore involves a simultaneous exposure of the image of the first planar reference face and of the second reference face. This simultaneous exposure can be done in two, three or more iterations, even in bursts over n exposures (n being an integer greater than one, for example ranging from two to fifteen). In this way, it is possible to have several images (a series of images) both of the first planar reference face and of the second reference face, which makes it possible to perform a processing by computation algorithms, not of a single image of the first planar reference face and of the second reference face, but a processing of the series of images both of the first planar reference face and of the second reference face, and thus gain in accuracy.

In particular, according to one possible provision, this generation of image(s) of the first planar reference face and of the second reference face is performed by the optical system used without having to perform an adjustment, as will be explained later. In this case, there is no specific setting to be performed in the optical system, which allows for a significant time saving in the performance of the measurement of the relative position of the three-dimensional target. This solution notably offers the advantage over the prior art of not requiring either several measurement steps or even the modification of the settings and in particular the focal distance of the optical system which is looking at this target.

Also, when this target is used for measurement of relative position between a tool-holder and a work-holder, it is possible to become independent of the wear of the tool and of the thermal variations of the tool and/or of the work space of the machine-tool which receives the workpiece to be machined by placing this target on the tool-holder.

In one embodiment, the optical system comprises a first exposure system and a second exposure system, in which:
the depth of field of the first exposure system is at least 10 times greater than the depth of field of the second exposure system, and
the optical system is arranged such that the optical path of the first exposure system and the optical path of the second exposure system have a common section placed on the optical axis of the optical system and comprising the image focal plane of the first exposure system and the image focal plane of the second exposure system.

Such an optical system can be placed on one of the two objects concerned (a second object formed by a work-holder) and allows, through the two exposure systems, a simultaneous taking of two sharp images at two locations adjacent to one another on the other of the two objects (a first object formed by a tool-holder), these two locations of the first object being situated at a slightly different distance from the second object. Such an optical system makes it possible, as will be described in detail hereinbelow, through the two images, to three-dimensionally register the relative position between the first object and the second object which bears the optical system.

In one embodiment, the optical system is arranged such that the optical path from the object (first object) passes through at least a portion of one out of the first and the second exposure systems before reaching the other of the first and the second exposure systems. In this way, it is possible to have a section of optical path as input/output of the optical system which is common or very close for the first and the second exposure systems. It is thus possible not only to combine the first and the second exposure systems on the same optical system but also to be able to register two locations that are adjacent to one another on the first object, which are close to a few tens of millimetres, even a few millimetres, even less than a millimetre.

In one embodiment, the first and the second exposure systems are positioned in parallel to one another and the optical system also comprises an optical module positioned between the first and the second exposure systems and configured to deflect some of the light rays passing through at least a part of one out of the first and the second exposure systems to the other out of the first and the second exposure systems. According to one possibility, this optical module is or includes a catoptric optical system such as a mirror:

This optical system also possibly conforms to one or other or several of the following provisions:
the focal distance of the second exposure system is greater than the focal distance of the first exposure system,
the enlargement of the first exposure system is less than or equal to the enlargement of the second exposure system,
the depth of field (DOF1) of the first exposure system is greater than or equal to 0.8 millimetres,
the depth of field (DOF2) of the second exposure system is less than or equal to 0.1 millimetres,
the first exposure system is telecentric and the second exposure system is telecentric,
the first exposure system is configured such that its image focal plane can correspond to the reference face of the first structure, and
the second exposure system is configured such that its image focal plane can be secant with the inclined face of the three-dimensional target,
the optical device also comprises a third exposure system positioned on the tool-holder and configured to register the orientation of the useful face of the target and/or the angular orientation of the tool-holder.

The present invention relates also to a method for three-dimensional optical measurement according to three orthogonal directions X, Y and Z in the three-dimensional space of a machine-tool, between a tool-holder and a work-holder that are aligned and remote from one another in the main direction Z, in which:
an optical system is provided with an image acquisition system,
said optical system is mounted on the work-holder,
a target is provided comprising a useful face forming a positioning reference,
said target is mounted on the tool-holder,
the tool-holder and the work-holder are positioned such that the target can be placed in the optical axis of the optical system,
a single step of exposure of the target is performed with the optical system positioned so as to cooperate with the target, whereby the three-dimensional relative position between the holder of the workpiece to be machined and the tool-holder is determined.

According to an embodiment of this method, in the exposure step, the optical system and the target are positioned such that the image focal plane of the optical system can be merged with the useful face of the target.

According to this method, it is also possible to provide one or other or several of the following provisions:

said target is three-dimensional, and comprises, on a useful face:
a first structure defining a planar reference face divided up between at least:
a first portion whose surface is reflective according to a diffuse reflection, and
a second portion whose surface is reflective according to a specular reflection, and
a second structure having a face that is inclined relative to said planar reference face,
said optical system comprises a first exposure system and a second exposure system, in which:
the depth of field of the first exposure system is at least 10 times greater than the depth of field of the second exposure system, and
said optical system is arranged on the one hand such that the optical path of the first exposure system and the optical path of the second exposure system have a common section comprising the image focal plane of the first exposure system and the image focal plane of the second exposure system, and, on the other hand, such that the difference between the focal distance of the second exposure system and the focal distance of the first exposure system lies between the minimum distance and the maximum distance separating the reference face from the inclined face,
the tool-holder and the work-holder are positioned such that, on the one hand, the focal distance of the first exposure system can place the image focus of the first exposure system on the first structure of the target and that, on the other hand, the focal distance of the second exposure system can place the image focus of the second exposure system on the second structure of the target,
in said step of exposure with the optical system, at least one exposure is taken simultaneously with the first exposure system of the optical system and with the second exposure system of the optical system, whereby, for each exposure by the optical system, on the one hand, the first exposure system generates a first image of the target making it possible to identify, on the reference face, the position of the second portion relative to the first portion, which gives, firstly, a first piece of information on the relative position according to the direction X of the target relative to the first exposure system and, secondly, a second piece of information on the relative position between the target and the first exposure system according to the direction Y, and, on the other hand, the second exposure system generates a second image of the target comprising a sharp portion corresponding to a location of the inclined face of the second structure, which gives a third piece of information on the distance between said target and said second exposure system according to the direction Z.

According to another possible provision, said second portion of the planar reference face is divided up according to a series of localized zones positioned in the first portion and in which, when said first exposure system generates a first image of the target, the position of the localized zones of the second portion is identified on the reference face, which gives a piece of information on the relative position between said localized zones and the first exposure system making it possible to deduce the relative measurement according to the direction Y and according to the direction X.

BRIEF DESCRIPTION OF THE FIGURES

Examples of implementation of the invention are indicated in the description illustrated by the attached figures in which:

FIG. 2B shows the part of FIG. 2A corresponding to the tool-holder with the three-dimensional target, from the direction IIB of FIG. 2A, i.e. according to the direction Z, as seen by the optical system when the target is oriented towards the optical system, FIGS. 3A, 3B and 3C are three views illustrating the structure of the three-dimensional target, respectively from the front, in perspective and in cross section, and FIGS. 3D and 3E are perspective views of the second structure of the target respectively as in FIGS. 3A, 3B and 3C and according to a variant embodiment, FIG. 5 represents, in perspective and in an exploded view, a tool-holder equipped with the three-dimensional target.

EXEMPLARY EMBODIMENT(S) OF THE INVENTION

Figure 1:
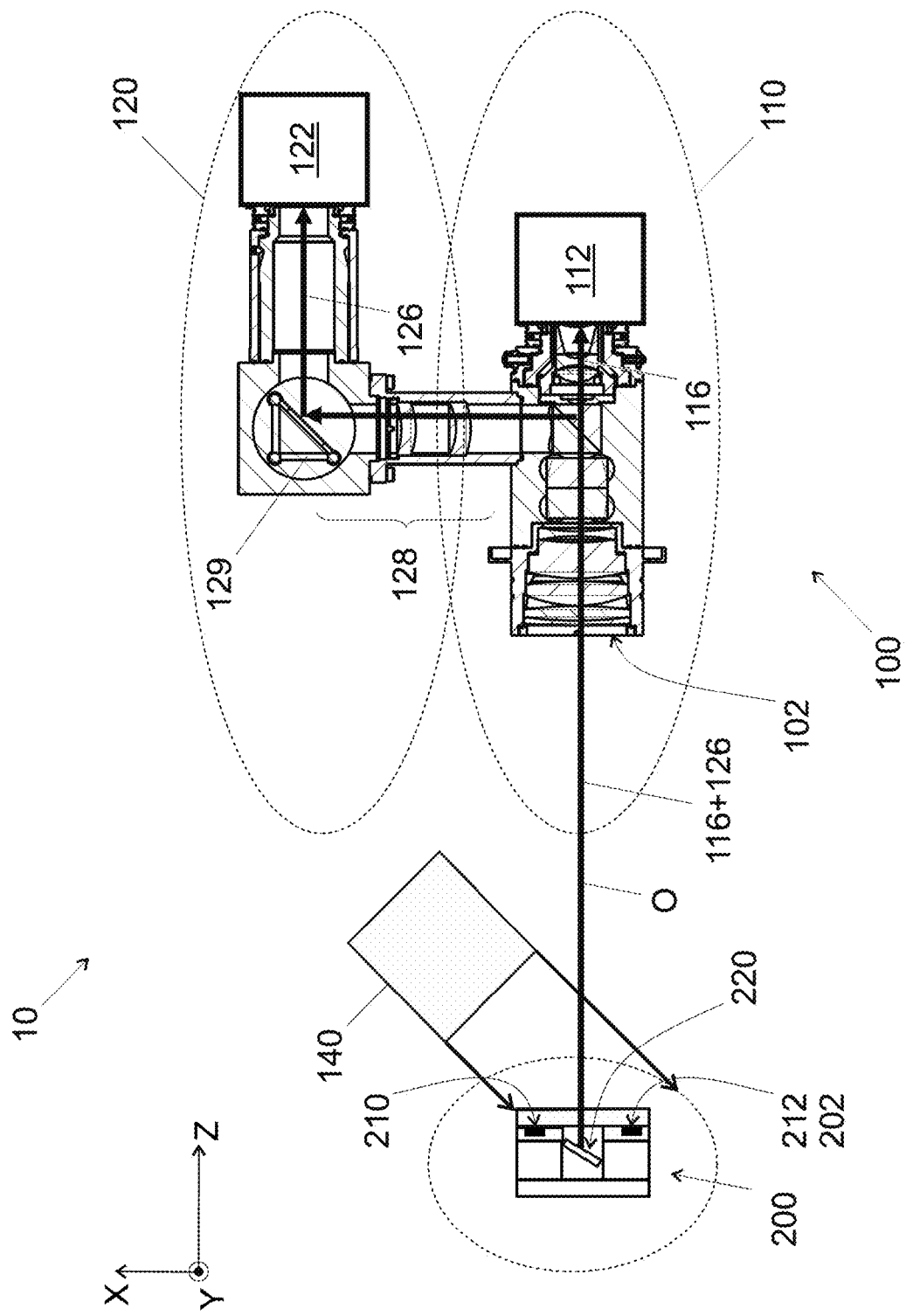
FIG. 1 illustrates a three-dimensional measuring device comprising a three-dimensional target and an optical system.

FIG. 1 shows an optical device 10 comprising an optical system 100 and a three-dimensional target 200 that can cooperate together to perform the three-dimensional measurement of the relative position between the target 200 and the optical system 100. In fact, in this measurement position, the target 200 is oriented towards the optical system 100, parallel to a main axis, forming a main horizontal direction Z. To this end, at the output of the optical system 100, the optical path O is orthogonal to a useful face 202 of the target 200.

The target 200 is now described in relation to FIGS. 1, 3A, 3B and 3C. The target 200 takes the form of a pellet, here of cylindrical form of circular section (it could be of square or other section), of which one side forms the useful face 202 for the performance of the measurement. For the performance of the measurement, this useful face 202 is therefore turned towards the optical system 100, and in particular towards the input face 102 of the optical system 100, the axis Z corresponding to the main direction (horizontal in the figures) separating the useful face 202 from the input face 102 of the optical system 100.

The surface of the useful face 202 of the target 200 is divided up between a first structure 210 and a second structure 220. The first structure 210 comprises a planar reference face 212 whose surface is smooth and is divided up between a first portion 214 whose surface is reflective according to a diffuse reflection and a second portion 216 whose surface is reflective according to a specular reflection. In one embodiment, the first portion 214 is coated with a diffusing reflective layer, for example of barium sulfate BaSO4, and the second portion 216 is formed by a layer that is reflective according to a specular reflection, for example of chromium. In the embodiment illustrated, the second portion 216 is made up of several localized zones 217 in the form of circles forming islands positioned within the first portion 214 which is continuous. These localized zones 217 can take other forms, such as segments or islands of a form other than a circle. These localized zones 217 define, between them, a geometrical figure belonging to the following list: quadrilateral, parallelogram, rectangle, square, rhombus, regular polygon and circle. This geometrical figure can be a geometrical figure with central symmetry. In FIGS. 3A and 3B, twenty four circular localized zones 217 are arranged in a square. The aim of this first structure 210 is to be able to accurately identify the centre C3 thereof using standard vision tools. With the square form, the two diagonals C1 and C2 of the square are secant at the centre of the square. It should be noted that, in the measurement position, as represented in FIGS. 1 to 3 and 5, the reference face 212 is positioned parallel to the directions X and Y, respectively forming a vertical direction (axis) and a transverse horizontal direction (axis) in the case of the arrangement illustrated.

The second structure 220 comprises a face which is inclined 222 relative to the reference face 212: this inclined face 222 is essentially planar, the median plane of this inclined face forming, relative to the reference face 212, an acute angle α lying between 10 degrees and 80 degrees, for example between 20 and 30 degrees, and preferably of the order of 25 degrees (see FIG. 3C).

In one embodiment, the surface of this inclined face 222 is not smooth but has relief elements 224 forming surface irregularities, which are either random or else according to a predetermined geometry, for example defining between them a form of grid or a network of lines, thus constituting a structured grid (not represented) or structured network of lines (see FIG. 3D).

Such relief elements 224 can be protruding or hollowed out, that is to say set back, relative to the median plane of the inclined face 222, particularly in the form of small roughnesses, or any other surface irregularity. Such relief elements 224 can be present over all the surface of the inclined face 222. Such relief elements can be evenly distributed over all the surface of the inclined face 222. For example, these relief elements 224 can form a set delimiting a grid or network pattern, or more generally a structured surface or a rough surface which makes it possible to have the light reflected on this inclined face 222 well diffused. The surface of the inclined face 222 of the second structure 222 is for example covered by one of the following elements: etched network or structured grid, with a pitch between the patterns of the grid or of the network lying between 5 and 100 micrometres, in particular between 5 and 50 micrometres, and in particular between 8 and 15 micrometres, for example of the order of 10 micrometres.

For example, this inclined face 222 is made of non-polished silicon or else of ceramic, or of non-polished metal or of glass, or any other structurable material, and the relief elements 224 have been obtained by photolithography, machining by chip removal, direct writing, etc., or any other structuring method. These relief elements 224 form, for example, depressions and/or protuberances respectively set back from/extending beyond the median plane by a few micrometres or by a few tens of micrometres, in particular between 0.5 and 50 micrometres.

In another embodiment, as illustrated in FIG. 3E, the surface of this inclined face 222 is smooth and comprises a network of lines of chromium, or of another material resulting in a specular reflection of these lines of chromium which constitute specular elements 225. These specular elements 225 in the form of lines are positioned parallel to one another. In the measurement position, these specular elements 225 in the form of lines or strips are positioned parallel to the plane Y, Z, such that, along the inclined surface, in the direction Z, these lines are encountered one by one (this is also the case when advancing in the direction X). The substrate forming the wafer of the second structure 220 can then be made of different materials, including glass or silicon, with, on the inclined face 222, a diffusing reflective layer, for example made of barium sulfate $BaSO_4$ which alternates with the specular elements 225 or else which covers all the surface of the inclined face, with the specular elements 225 positioned above this diffusing reflective layer. In an exemplary embodiment, these specular elements 225 in the form of lines form a network with a pitch of 25 micrometres, the lines (in particular of chromium) having a width of 12.5 micrometres, equal to the width of the line spacing or portion with a diffuse reflection which is also in the form of a lines or strip 12.5 micrometres wide. According to another implementation, a pitch of 10 micrometres or, more generally, a pitch between 5 and 50 micrometres, is used. It should be noted that these specular elements 225 which alternate with the rest of the surface which produces a diffuse reflection, could take forms other than continuous lines or segments forming strips, in particular discontinuous lines or broken lines, patterns such as dotted borders, circles, triangles, or any other geometrical form.

According to an embodiment that is not illustrated, the inclined face 222 of the second structure 220 bears spot, protruding relief elements 224, in the form of small mounds or spikes, which are distributed in mutually parallel rows, the relief elements 224 being mutually offset from one row to another, to form a staggered pattern. According to another embodiment that is not illustrated, the inclined face 222 of the second structure 220 bears protruding relief elements 224 in the form of segments that are parallel to one another and equidistant according to two series intersecting at 90° to one another. This set of relief elements 224 constitutes a grid pattern. It should be noted that this grid can be formed by two series of mutually parallel segments, with series of segments intersecting according to an angle other than 90° to one another. In FIGS. 3A, 3B, 3C and 3D, the inclined face 222 of the second structure 220 bears relief elements 224 hollowed out in the form of a series of segments that are parallel to one another and equidistant from one another along the direction X: these relief elements 224 form, in this case, grooves. This direction X is therefore orthogonal to the direction of the segments forming the relief elements 224.

In the embodiment of FIG. 3E, the surface of the inclined face 222 of the second structure 220 is therefore covered by a network of specular lines 225, namely of mutually parallel continuous strips whose surface has specular reflection properties.

Thus, in some of the abovementioned cases, and in particular those of FIGS. 3D and 3E, the surface of the inclined face 222 of the second structure 220 is striated.

According to the embodiments represented for the target 200, the pellet delimiting the target 200 comprises, on its useful face 202, the first structure 210 which occupies most of the surface of the useful face 202, and, within the first structure 210, a zone reserved for the second structure 220. In this situation, the first structure 210 surrounds the second structure 220. More specifically, the localized zones 217 of the second portion 216 of the first structure 210 define a square which surrounds the second structure 220. According to one possible provision, and in the case of the embodiments of the target 200 as represented, the first structure 210 and the second structure 220 are positioned on the useful face 202 concentrically to one another. Moreover, as in the cases represented, the first structure 210 delimits an aperture 218 for a housing 219 housing said second structure 220, which is for example positioned on a wafer having the inclined face 222. When the wafer is housed in the housing 219 of the first structure 210, its inclined face 222 is turned towards the outside of the housing 219, towards the aperture 218. In this particular case, the second structure 220 is positioned in said housing 219 with the inclined face 222 which is set back relative to the reference face of said first structure 210: this means that the inclined face 22, therefore the second structure 220, is positioned to the rear, behind the plane delimited by the reference face 212 (relative to the main direction Z, see FIG. 3B), in the housing 219, and is so set back for example by 0.05 to 2 millimetres or else by around 0.15 millimetres. According to another possibility, not represented, the second structure 220 is positioned to the fore, in front of the plane delimited by the reference face 212. According to yet another possibility, not represented, the second structure 220 is positioned on either side of the plane delimited by the reference face 212, namely a part of the inclined face 222 is positioned behind and the other part of the inclined face 222 is positioned in front, relative to the reference face 212.

In order to protect the first structure 210 and the second structure 220 from the environment (dust, oil, impacts, etc.), as can be seen in FIG. 3C, the target 200 comprises a protection plate 230 in a transparent material, in particular glass, covering the first structure 210 and the second structure 220 on the side of the useful face 202. According to one implementation possibility, as represented in FIG. 3C, the target 200 comprises, in the form of a stack, the following elements. A bottom wall 231 is topped by a top plate 232 formed by a plate cut out at its centre in order to delimit the housing 219 delimited by the aperture 218 on the side of the useful face 202. The top plate 232 is topped by the protection plate 230 closing the housing 219. The whole is surrounded by a cylindrical wall 234 retaining all of the target 200. The second structure 220 is for example a wafer of silicon housed in the housing 219 with the inclined face 222 (bearing the relief elements 224 or specular elements 225) turned towards the useful face 202. The face of the top plate 232 turned towards the useful face 202 comprises a reflective layer 233 in two zones as described previously respectively in relation to the first portion 214 (reflective surface according to a diffuse reflection) and the second portion 216 (reflective surface according to a specular reflection, in particular in the form of localized elements 217).

Moreover, the target 200 can be equipped with a chip of RFID (radio frequency identification) type, not represented, in order to allow the storage and reading of a unique identifier and of data related to the target 200 and related to a first object on which the target 200 is intended to be mounted, in particular a tool-holder 310 (see FIGS. 5 and 6): for example, the reference of this tool-holder 310 and other information linked to the use of this tool-holder (for example its serial number, its type, its setting relative to the material centre or work-holder, the number of times it has been used, etc.).

Reference is now made to FIG. 1 to present the optical system 100 associated with the target 200 which has just been described to form, together, an optical device 10 allowing the measurement of the relative position between two objects according to the three directions of space. In particular, an orthonormal space is considered in a Cartesian reference frame X, Y and Z, which is direct in the figures. This optical system 100 is intended to simultaneously take, in the same sequence of exposures, both an image of the first structure 210 of the target 200 and at the same time an image of the second structure 220 of the target 200. According to the present text, this simultaneous exposure of the two images is performed without adjustment, which allows for great rapidity of execution of this exposure. Other features, linked in particular to the specific structure of the target 200 which has just been described, also allow a maximal accuracy. The applicant company has produced a three-dimensional optical measuring device 10 according to the present description that has managed to produce, in a half-second or less, a repeatable relative measurement with an accuracy of one micrometre or less.

This optical system 100 comprises a first exposure system 110 and a second exposure system 120. According to one provision, said optical system 100 is arranged such that the difference between the focal distance of the second exposure system 120 and the focal distance of the first exposure system 110 lies between the minimum distance and the maximum distance separating the reference face 212 from the inclined face 202. According to another provision, the depth of field DOF1 of the first exposure system 110 is much greater and in particular at least ten times greater than the depth of field DOF2 of the second exposure system 120. For example the depth of field DOF1 of the first exposure system 110 is between 10 and 10,000, or even between 100 and 5000 times greater than the depth of field DOF2 of the second exposure system 120. Among different possibilities, the depth of field DOF1 of the first exposure system 110 is greater than or equal to 0.8 millimetres, or else it lies between 0.5 and 5 millimetres, or else it lies between 0.8 and 3 millimetres, or else it lies between 1 and 2 millimetres. Also, according to different possibilities, the depth of field DOF2 of the second exposure system 120 is less than or equal to 0.1 millimetres, or else it lies between 5 and 50 micrometres, or else it lies between 8 and 30 micrometres, or else it lies between 10 and 20 micrometres.

This allows the first exposure system 110 to naturally and without other setting, focus on all the reference face 212 of the first structure 210 within a range of distance between the target 200 and the first exposure system 110 that can vary over a few millimetres. In parallel, the second exposure system 120 is capable of naturally and without other setting focusing on the portion of the inclined face 222 of the second structure 210 which is at a distance from the second exposure system 120 corresponding to the focal distance of the second exposure system 120. According to one possibility, the enlargement of the first exposure system 210 is less than the enlargement of the second exposure system 220.

Each exposure system within the meaning of the present text (first exposure system 210 and second exposure system 220) corresponds to an optical system, in particular a centred optical system, comprising a set of optical components and an image acquisition system. Such an image acquisition system makes it possible to take photographs and/or videos, and is for example a camera or a photographic appliance, in particular a digital photographic appliance. According to one possible provision, the first image acquisition system 112 of the first exposure system 110 and the second image acquisition system 122 of the second exposure system 120 are synchronized in order to simultaneously take a first image by the first exposure system 110 and a second image by the second exposure system 120.

To allow the simultaneous access to the vision of the target 200 by the first exposure system 210 and by the second exposure system 220, the latter have a common portion of optical path which is directed towards and originates from the object watched by the optical system 100, in this case the target 200 (see FIGS. 1 and 2) after the target 200 is mounted on the first object and the optical system 100 is mounted on the second object. To this end, in the measurement position, the first exposure system 210 is turned towards the useful face 202 of the target 200 and forms an exposure system aligned with the target 200, and the second exposure system 120 has an optical path 126 which meets the optical path 116 of the exposure system 110 aligned with the target 200 and forms an exposure system that is off centre relative to the target 200, relative to the optical axis O of the optical system 100, and relative to the common portion of the optical paths 116 and 126 (aligned with the target). In other words, the optical path of the exposure system aligned with the target 200 is substantially at right angles to the reference face 212. The optical axis O is superimposed with the median ray of the common portion of the first optical path 116 and of the second optical path 126. In this common portion, the sections of the first optical path 116 and of the second optical path 126 are mutually parallel, but not necessarily superimposed.

In particular, as illustrated in FIGS. 1 and 2, the first exposure system 210 is turned towards the useful face 202 of the target 200, in other words is oriented at right angles to the useful face 202 of the target 200. This means that the optical axis O and the common portion of the optical paths 116 and 126 are aligned with the target 200 and are at right angles to the useful face 202 (and therefore to the reference face 212) of the target 200. In this configuration, as is seen in FIGS. 1 and 2, the optical axis O and the common portion of the optical paths 116 and 126 are parallel to the main direction Z, and are orthogonal to the transverse directions X and Y, and to the plane X, Y.

In the common portion of the optical paths 116 and 126, the optical rays are at least partly merged with or else simply parallel to one another. The second exposure system 120 which is off centre has a portion of optical path 126 internal to this second exposure system 120 which is preferably parallel to the optical axis O. This internal portion of optical path 126 is linked to, or more specifically meets, the optical path 116 of the first exposure system 110 aligned by a dedicated optical module 128, comprising a catoptric optical system such as a mirror 129. In this way, the input of the off-centre exposure system (here the second exposure system 120) is linked to the trajectory or optical path of the aligned exposure system (here the first exposure system 110).

More generally, it is understood that one out of the first exposure system 110 and the second exposure system 120 is turned towards the useful face 202 of the target 200 and forms an exposure system aligned with the target 200, and the other exposure system out of the first exposure system 110 and the second exposure system 120 has an optical path 126 which meets the optical path 116 of the exposure system 110 aligned with the target 200 and forms an off-centre exposure system. This means that the other exposure system has an optical axis which passes through the inclined face 222, that is to say the second structure 220 of the target 200. Also, the first exposure system 110 and the second exposure system 120 are positioned in parallel to one another. Furthermore, the optical system also comprises an optical module 128 (for example with a catoptric optical system such as a mirror) positioned between the first exposure system 110 and the second exposure system 120 and configured to deflect a portion of the light rays passing through at least a part of one out of the first and the second exposure systems to the other of the first and the second exposure systems. Conversely, the optical system 100 is arranged such that the optical path from the object watched (the target 200 in FIGS. 1 and 2) by the optical system 100 passes through at least a portion of one out of the first exposure system 110 and the second exposure system 120 (the first exposure system 110 in FIGS. 1 and 2) before reaching the other out of the first exposure system 110 and the second exposure system 120 (the second exposure system 120 in FIGS. 1 and 2).

In one embodiment, the focal distance of the second exposure system 120 is greater than the focal distance of the first exposure system 110. For example, the difference between the focal distance of the second exposure system 120 and the focal distance of the first exposure system 110 lies between 0.5 and 5 millimetres.

In one embodiment, the enlargement of the first exposure system 110 is less than or equal to the enlargement of the second exposure system 120. For example, the enlargement of the first exposure system 110 lies between 0.2 and 1 times the enlargement of the second exposure system 120. For example, the enlargement of the first exposure system 110 lies between 0.3 and 0.8, or else between 0.4 and 0.6, preferably around 0.5 times the enlargement of the second exposure system 120.

In the embodiment of FIGS. 1 and 2, the optical system 100 also comprises a light source 140 oriented towards the three-dimensional target 200, this light source 140 being positioned in order to constitute a lateral illumination of the three-dimensional target 200. To this end, this light source 140 is arranged off centre and inclined relative to the optical path 116+126 of the optical system 100. In particular, the light rays from the light source 140 form, with the reference face 212 of the target, an angle such that their specular reflection on the reflective surfaces of the target, and in particular on the localized zones 217, generates reflected light rays which do not enter into the optical system 100. Likewise, when the inclined face 222 comprises specular elements 225, the reflection of the light rays from the light source 140 on these specular elements 225 does not enter into the optical system 100.

According to one embodiment, the first exposure system 210 used and the second exposure system 220 used are telecentric. As a reminder, telecentricity is a characteristic of an optical system in which all the main rays (the central ray of each beam of rays) which pass through the system are practically collimated and parallel to the optical axis. In the case of telecentric optics, the notion of depth of field is replaced by that of working distance. According to another embodiment, the first exposure system 210 used and the second exposure system 220 used are not, or are not both, telecentric. In the case where they are both telecentric, they can be used also to measure the geometrical characteristics of the tools positioned on the tool-holder 310.

Figure 2A:
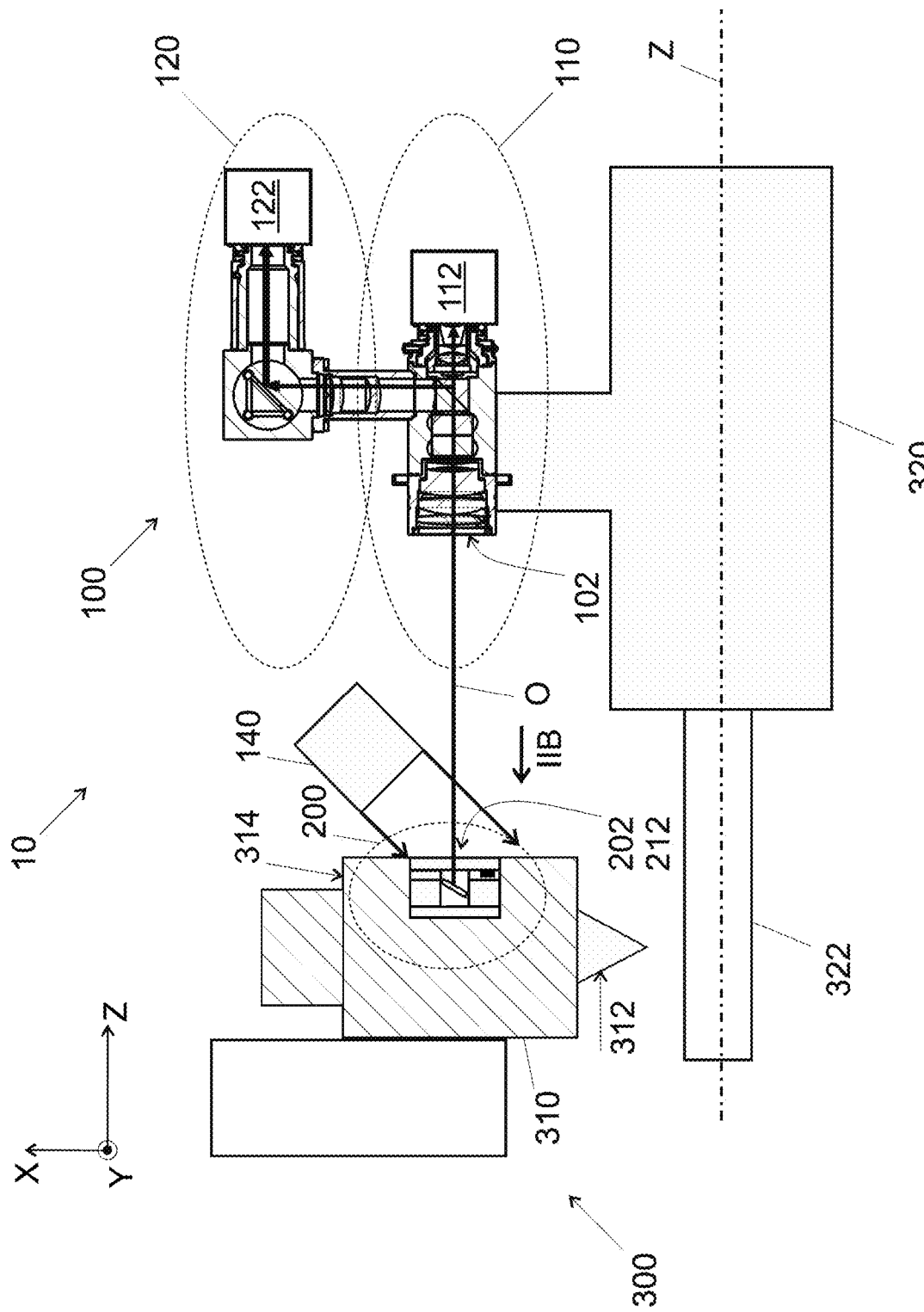
FIG. 2A illustrates the use of the three-dimensional measuring device of FIG. 1 in a machine-tool according to the invention for the measurement in space of the relative position between the tool-holder and the work-holder (also called material spindle)
Figure 3A:
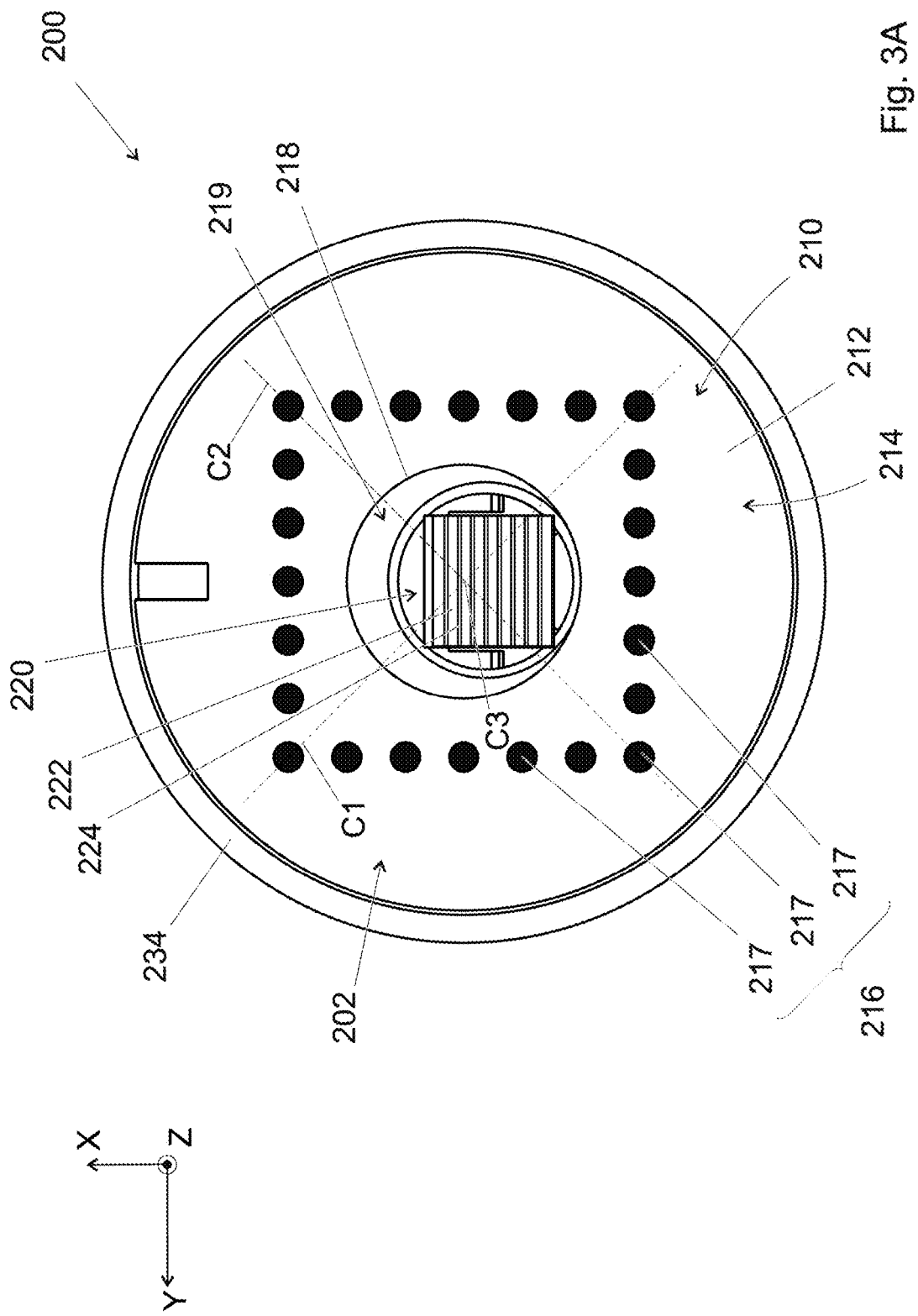
Figure 3B:
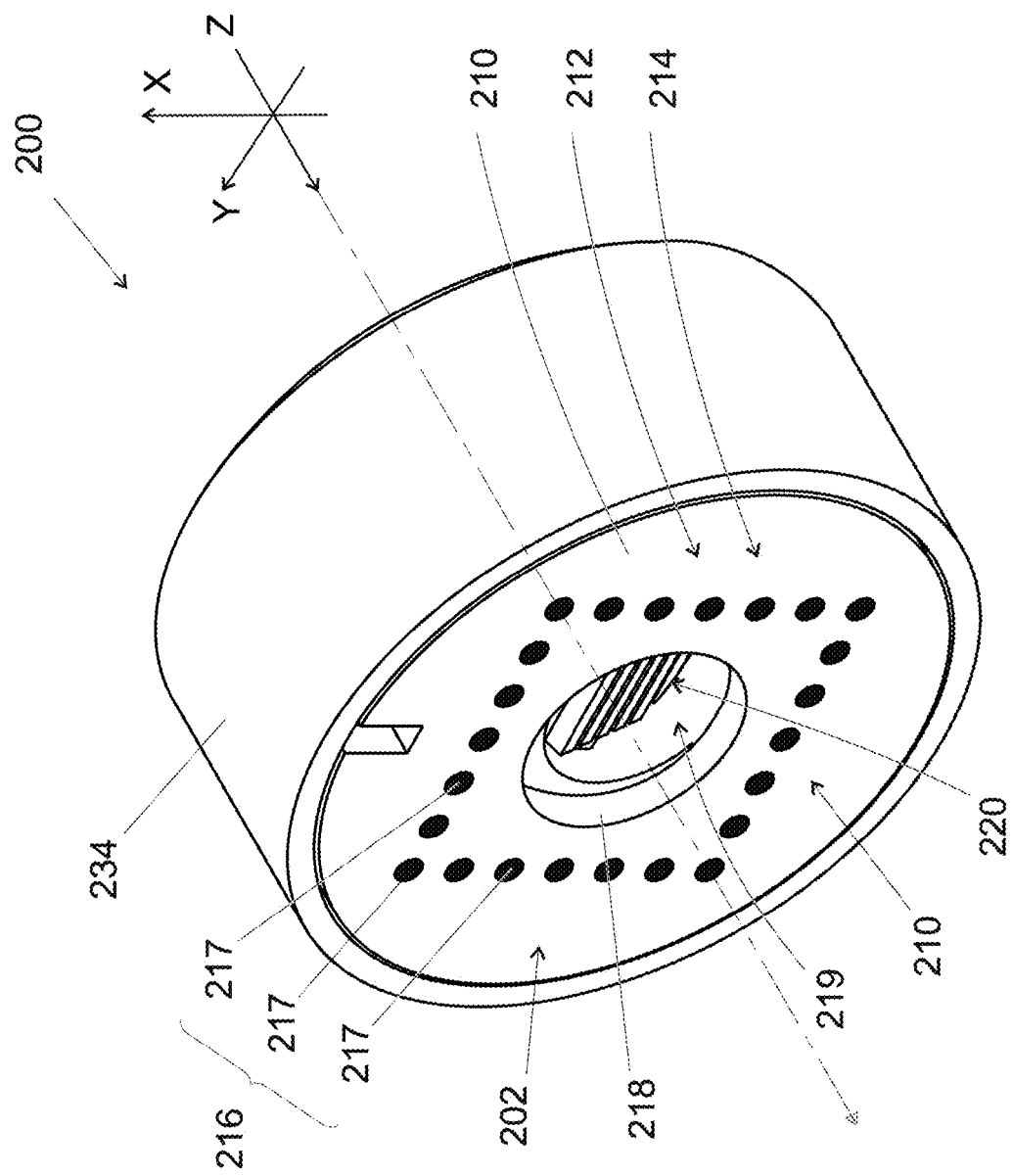
Figure 6:
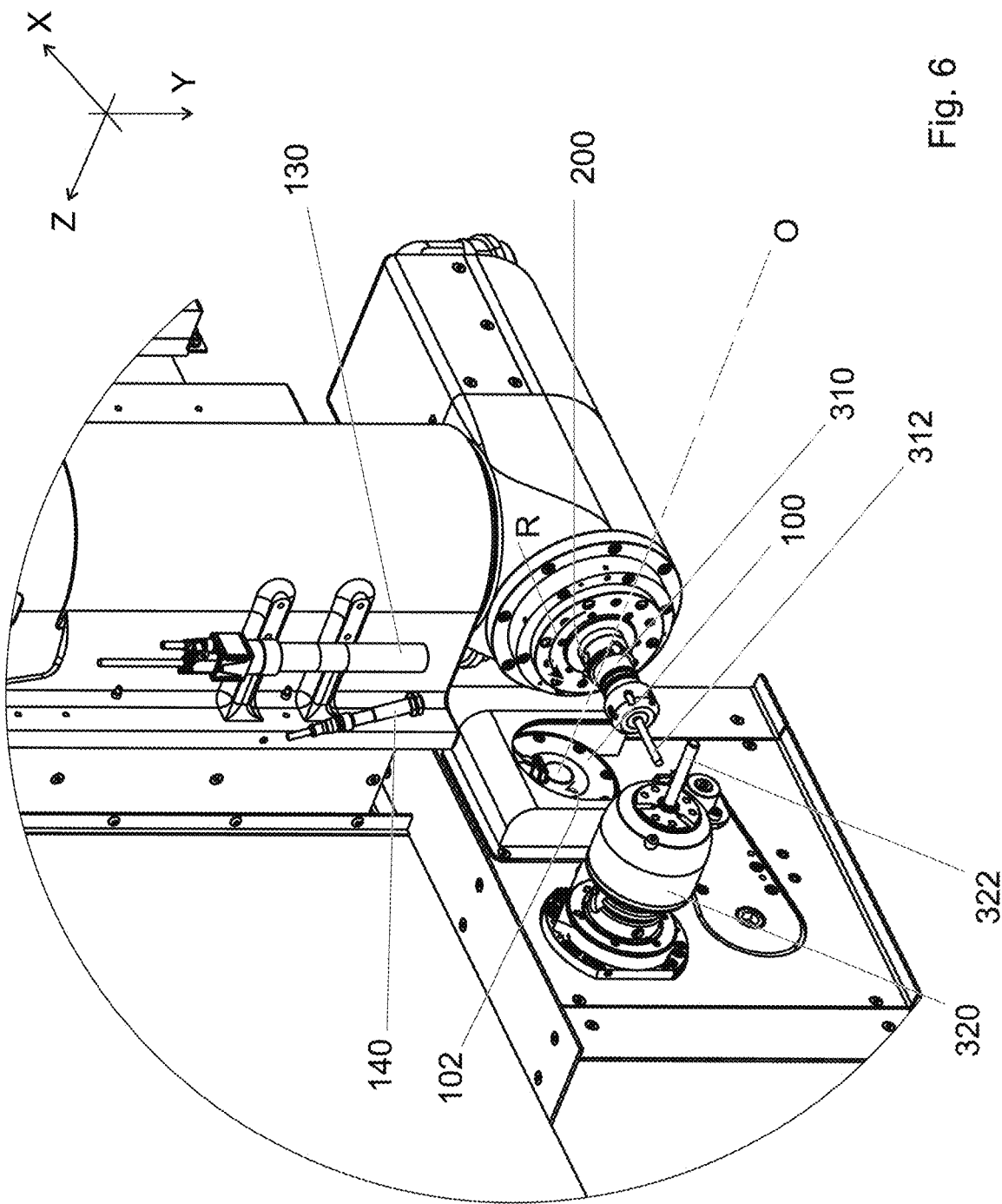
FIG. 6 illustrates the mounting of the three-dimensional optical measuring device in a tool-holder according to the invention.

Reference is now made to FIGS. 2A and 6 to explain the method for three-dimensional optical measurement between the target 200 and the optical system 100, in the case of a machine-tool whose machining module 300 comprises such an optical device 10. The reference directions X, Y and Z taken are those of the machine-tool, in particular of the frame of the machine-tool, which gives a vertical direction X (or first transverse axis), a main horizontal direction Z (or main axis) and a lateral horizontal direction Y (or second transverse axis). The target 200 is placed on the tool-holder 310 serving as first object (see FIG. 5): the tool-holder 310 extends in a horizontal main direction, corresponding to the axis X, with the possibility of rotating about this axis X. To this end, a part of the tool-holder 310, for example the clamp, has recesses on its periphery, usually dedicated to the mounting of the clamp gripping/releasing tool, in which the target 200 can be placed, possibly associated with an RFID chip as explained previously. Moreover, the optical system 100 is mounted on the work-holder 320 serving as second object (see FIG. 6) and receiving the workpiece to be machined 322. The work-holder 320 extends along its horizontal main direction, corresponding to the axis Z, with the possibility of rotating about this axis Z. Then, the work-holder 320 and the tool-holder 310 are placed in a close position, prior to a machining step, placing the tool 312 and the workpiece to be machined in proximity to one another, in a relative measurement position. The positioning of the target 200 on the tool-holder 310 and the positioning of the optical system 100 on the work-holder 320 make it possible, in this relative measurement position, to place the target 200, and more specifically the reference face 202, in the extension of the optical axis O of the optical system 100 (note that this optical axis O is parallel to the direction Z). Thus, the reference face 202 of the target 200 is turned towards the input face 102 of the optical system 100.

As in the case represented in FIG. 6, the optical device 10 also comprises a third exposure system 130 positioned on the tool-holder 310 and configured to register the orientation of the useful face 202 of the target 200 and/or the angular orientation of the rotary part of the tool-holder 310, in particular about the axis X. A preliminary additional step, of positioning of the target 200, is performed before the step of simultaneous exposure with said optical system 100, according to which:

the tool-holder 310 and the work-holder 320 are positioned such that the useful face 202 of the three-dimensional target 200 is in the optical path O of the optical system 100. In particular, the third exposure system 130 can be used to register the angular orientation of the target 200 relative to the rotary part of the tool-holder 310, therefore relative to the axis X, which makes it possible to modify, if necessary, the angular orientation of the rotary part of the tool-holder 310 (see the arrow R in FIG. 6), and thus place the target 200 such that its useful face 202 is turned towards the optical system 100. The relative measurement position is obtained in which, when the target 200 is oriented towards the optical system 100 as explained previously in the case of FIGS. 1 and 2A, is obtained: in this case, the direction Z extends between the target 200 and the optical system 100.

In the first use of the optical device 10, namely of the optical system 100 and of an associated target 200, respectively mounted on a work-holder 320 (or more generally a second object) and on a tool-holder 310 (or more generally a first object), a preliminary additional step has to be performed, of spatial referencing of the position of the target 200 relative to the tool-holder 310 (or more generally a first object) which bears the target 200 in the three directions X, Y and Z. It should be noted that, obviously, the parameters of the optical system 100, namely of the first exposure system 110 and of the second exposure system, are known, including their focal distance. At this stage, it can be mentioned that when the work space of the machining module 300 is confined and maintained at constant temperature, this thermal stability generates a dimensional stability in the optical device 10 and therefore in its parameters.

It is recalled that the measurement of the three-dimensional relative position between the target 200 and the optical system 100 is used in the case of a machine-tool to ultimately know the three-dimensional relative position in terms of X, Y and Z between the tool-holder 310 (or more generally a first object) and the work-holder 320 (or more generally a second object).

In the present text, the three directions X, Y and Z are, for example, the axes of the machining module 300 of the machine-tool. Thus, Z can be defined as being the main axis, namely the main horizontal direction separating the first object (the tool-holder 310) from the second object (from the work-holder 320). X can be defined as the vertical direction or, more generally, a first transverse axis, and Y can be defined as a lateral horizontal direction or, more generally, a second transverse axis. In one embodiment, the tool-holder 310 rotates about an axis parallel to this direction X.

In this step of spatial referencing of the position in the three directions X, Y and Z of the target 200 (calibration of the optical device 10), for example with the arrangement of FIGS. 2A and 2B, an exposure by the optical system 100 is activated which results, on the one hand, in the generation by the first image acquisition system 112 of the first exposure system 110 of a first image of all the useful face 202 of the target 200 with all the reference face 212 which is sharp and, on the other hand, the generation by the second image acquisition system 122 of the second exposure system 120 of a second image of all the inclined face 222 of the target 200 with only a sharp zone in the form of a horizontal strip. This first image comprises the image of the localized zones 217, here delimiting a square (see FIG. 3A), such that the processing of the first image generates the diagonals C1 and C2 of the square and makes it possible to identify the centre C3 of the square. Thus, since the position of the optical axis O on the first image is known, the determination of the position of the centre C3 of the square makes it possible to know the position in terms of X and in terms of Y of the target 200 relative to the optical axis O, but also, on the one hand, relative to a reference point 314 in the direction X on the tool-holder 310 and, on the other hand, relative to a reference point 316 in the direction Y on the tool-holder 310. In effect, as can be seen in FIGS. 2A and 2B, as X reference, a face of the tool-holder 310 is used which is orthogonal to the axis X, for example resulting from a recessed shoulder along a section of the tool-holder 310, visible as a line on the first image and which face forms said reference point 314 in the direction X. Furthermore, as can be seen in FIGS. 2A and 2B, as Y reference, a dimension of the tool-holder 310 in proximity to the target 200 is used, which is orthogonal to the axis X, and in the case represented which is the width (parallel to the direction Y) of the tool-holder 310 in proximity to the target 200, for example the diameter when this portion of the tool-holder 310 is cylindrical of circular section; this dimension forms said reference point 316 in the direction Y.

Figure 4B:
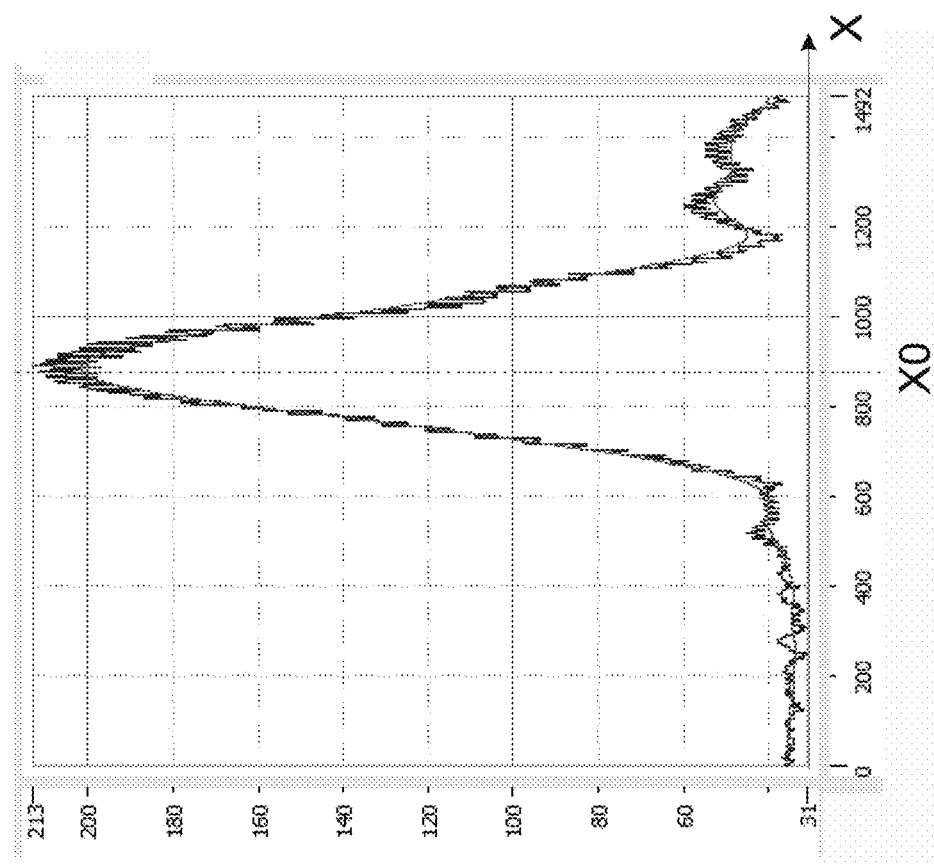
FIGS. 4A and 4B illustrate the processing of the image generated by the second exposure system of the optical system.
Figure 4A:
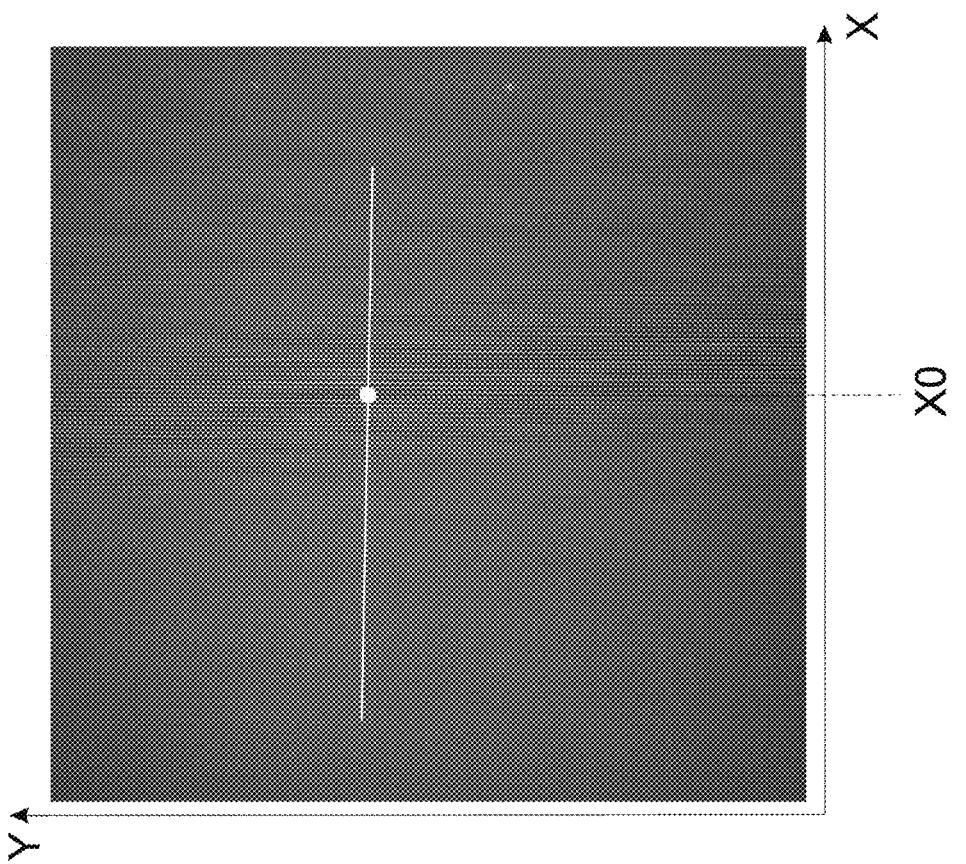

In parallel, the processing of the second image, an example of which is visible in FIG. 4A, is performed. Through the analysis of the local contrast of this second image (see FIG. 4B representing curves of contrast as a function of the position in terms of X), the position X0 in the vertical direction X of the sharp zone of the second image is determined. This analysis is done via an algorithm that makes it possible to determine the sharpest pixels of the image. Since the inclination of the inclined face 222 is known, a curve is obtained of mapping between X and Z of this inclined face 222, specific to the target 200. By virtue of this mapping curve, the knowledge of the position X0 (see FIGS. 4A and 4B) makes it possible to deduce therefrom the position Z0 of the inclined face 222 on the optical axis O, and therefore the position in terms of Z of the target 200 relative to the optical system 100. Moreover, the relative position in terms of Z of the optical system 100 relative to the work-holder 320 is known through a measurement rule (not represented) positioned along the axis X on the work-holder 320 and which supports the optical system 100. Similarly, the relative position in terms of Z of the target 200 relative to the reference point 314 of the tool-holder 310 is known.

By performing this operation multiple times, each time modifying the distance in terms of Z of the work-holder 310 relative to the tool-holder 320 (for example by retracting or advancing the work-holder 310), it is thus possible to reconstruct the three-dimensional image of the inclined face 222 of the target 200, and have a reference base forming a mapping for the three-dimensional coordinates of the inclined face 222 of the target 200 relative to the tool-holder 310. Ultimately, it is all of the useful face 202 of the target 200 (reference face 212 and inclined face 222) which is spatially referenced in the three directions X, Y and Z relative to the tool-holder 310.

Next, the actual measurement can be performed whenever necessary during operations of use of the machining module 300 equipped with this target 200 and with this optical system 100, not dismantled betweentimes to conserve the accuracy of the measurement of the spatial referencing explained previously. To this end, there is used for example the arrangement of FIG. 2A. If necessary, a rotation of the work-holder 320 is performed about its axis of rotation which is parallel to the axis X (see the arrow R in FIG. 6), to align the target 200 with the optical system 100. Then, an exposure by the optical system 100 is activated, which results, on the one hand, in the generation by the first image acquisition system 112 of the first exposure system 110 of a first image of all the useful face 202 of the target 200 with all the reference face 212 which is sharp and, on the other hand, the generation by the second image acquisition system 122 of the second exposure system 120 of a second image of all the inclined face 222 of the target 200 with only a sharp zone in the form of a horizontal strip corresponding to the focal distance of the second exposure system 120. The analysis of this first image makes it possible, as explained previously, to identify the centre C3 of the square formed by the localized elements 217, and thus the position in terms of X and in terms of Y of the target 200 relative to the optical axis O, and also relative to the tool-holder 310. The analysis of the second image and in particular of the position of the sharp zone of the second image (as in FIG. 2A) in the direction X makes it possible to know the position in terms of Z, therefore the distance, of the target 200 relative to the optical system 100. In effect, for the second image, since the position Z of each pixel of the image of the inclined face 222 relative to the references 314 and 316 on the tool-holder 310 is known, it is possible to very rapidly measure the position Z of the target 200 and therefore of the tool-holder 310.

It will be understood from the above that, in this way, solely through the analysis of the two images generated by the optical system 100, without a loss of time that a setting or an adjustment of this optical system 100 would entail, the position in terms of X, Y and Z of the target 200 relative to the optical system 100 and starting from the tool-holder 310 relative to the work-holder 320, is very rapidly measured. This is possible because the position in terms of X, Y and Z of the optical system 100 relative to the work-holder 320 is known.

The present text relates also to an optical system for the three-dimensional measurement of the relative position between a first object and a second object on which said optical system is intended to be mounted, said optical system comprising a first exposure system and a second exposure system, in which:
  the depth of field of the first exposure system is at least 10 times greater than the depth of field of the second exposure system,
  and
  the optical system is arranged such that the optical path of the first exposure system and the optical path of the second exposure system have a common section comprising the image focal plane of the first exposure system and the image focal plane of the second exposure system.

The present text relates also to a method for three-dimensional optical measurement according to three orthogonal directions X, Y and Z, between a first object and a second object that are aligned and remote from one another in the main direction Z, in which:
  a three-dimensional target is provided comprising, on a useful face forming a positioning reference:
    a first structure defining a planar reference face divided up between at least:
      a first portion whose surface is reflective according to first reflection parameters, and
      a second portion whose surface is reflective according to second reflection parameters different from the first reflection parameters, and
    a second structure having a face that is inclined relative to said planar reference face
  an optical system is provided
comprising a first exposure system and a second exposure system, in which:
  the depth of field of the first exposure system is at least 10 times greater than the depth of field of the second exposure system, and
  said optical system is arranged, on the one hand, such that the optical path of the first exposure system and the optical path of the second exposure system have a common section comprising the image focal plane of the first exposure system and the image focal plane of the second exposure system,
  and, on the other hand, such that the difference between the focal distance of the second exposure system and the focal distance of the first exposure system lies between the minimum distance and the maximum distance separating the reference face from the inclined face,
  said three-dimensional target is positioned on the first object such that, on the one hand, the focal distance of the first exposure system can place the image focus of the first exposure system on the first structure of the target and, on the other hand, the focal distance of the second exposure system can place the image focus of the second exposure system on the second structure of the target,
  said optical system is positioned on the second object,
  at least one exposure is performed simultaneously with the first exposure system of the optical system and with the second exposure system of the optical system,
  whereby, for each exposure by the optical system, on the one hand, the first exposure system generates a first image of the target that makes it possible to identify, on the reference face, the position of the second portion relative to the first portion, which gives, firstly, a first piece of information on the relative position according to the direction X of the target relative to the first exposure system and, secondly, a second piece of information on the relative position between the target and the first exposure system according to the direction Y, and, on the other hand, the second exposure system generates a second image of the target comprising a sharp portion corresponding to a location of the inclined face of the second structure, which gives a third piece of information on the distance between said target and said second exposure system according to the direction Z.

As already explained previously, the optical system therefore generates the first image and the second image synchronously. Furthermore, the optical system 100 generates the first image and the second image without performing adjustment, which makes it possible to perform the exposure immediately and without loss of time.

The present text relates also to a machine-tool comprising an optical target as defined previously, and a machine-tool comprising an optical system as defined previously. The present text relates also to a machine-tool comprising a machining module equipped with a tool-holder and a work-holder, and an optical measuring device for the three-dimensional measurement of the relative position between said tool-holder and said work-holder, said optical measuring device comprising an optical system mounted on the work-holder and a target mounted on the tool-holder and comprising a useful face forming a positioning reference that can be placed in the optical axis of the optical system. For example, the optical measuring device is configured to make it possible, through a single step of exposure of the target by the optical system, to determine the three-dimensional relative position between the holder of the workpiece to be machined and the tool-holder. Also, according to one possible provision, the target is positioned such that the image focal plane of the optical system can be merged with the useful face of the target.

The present text also relates to an arrangement for the three-dimensional optical measurement of the relative position between a first object and a second object, comprising:
- an installation comprising a first object and a second object,
- an optical measuring device as described in the present text in which;
- the first exposure system is configured such that its image focal plane is capable of corresponding to the reference face of the first structure, and
- the second exposure system is configured such that its image focal plane is capable of being secant with the inclined face of the three-dimensional target. According to a second possibility, compatible with the above-mentioned first possibility or taken alone, the optical measuring device is such that:
- the focal distance of the first exposure system can make it possible to place the image focus on the first structure,
- the focal distance of the second exposure system can make it possible to place the image focus on the second structure.

Such an installation is for example a piece of equipment, a machine, a module, in particular scientific or technical, having a first object and a second object that can be moved relative to one another and for which it is necessary to perform a referencing of relative position in the three-dimensional space. For example, this installation is a machine-tool or a machining module with, as first object, the tool-holder or one of the tool-holders, and, as second object, the work-support bearing the piece to be machined (bar, blank, etc.). According to another example, this installation is a unit for mounting electronic components on a PCB (printed circuit board), with, as first object, the support of the printed circuit board and, as second object, the clamp or other tool for mounting an electronic component. According to yet another example this installation is a cell culture module for performing the seeding of series of wells housed on microplates, the first object being the support of the microplate and the second object being the support of the device for injecting the cells to be cultivated.

The present text relates also to a method for three-dimensional optical measurement in three orthogonal directions X, Y and Z, between a first object and a second object that are aligned and remote from one another in the main direction Z, in which:
- a three-dimensional target is provided that includes, on a useful face forming a positioning reference, and comprising:
- a first structure defining a planar reference face divided up between at least:
- a first portion whose surface is reflective according to first reflection parameters, and
- a second portion whose surface is reflective according to second reflection parameters that are different from the first reflection parameters, and
- a second structure having an inclined face relative to said planar reference face
- an optical system is provided comprising a first exposure system and a second exposure system, in which:
- said three-dimensional target is positioned on the first object such that, on the one hand, the focal distance of the first exposure system is capable of placing the image focus of the first exposure system on the first structure of the target and, on the other hand, the focal distance of the second exposure system is capable of placing the image focus of the second exposure system on the second structure of the target,
- said optical system is positioned on the second object,
- at least one exposure is taken simultaneously with the first exposure system of the optical system and with the second exposure system of the optical system, whereby, for each exposure by the optical system, on the one hand the first exposure system generates a first image of the target making it possible to identify, on the reference face, the position of the second portion relative to the first portion (in particular, the position of the localised zones on the reference face), which gives, firstly, a first piece of information on the relative position in the direction X of the target relative to the first exposure system and, secondly, a second piece of information on the relative position between the target and the first exposure system in the direction Y, and, on the other hand, the second exposure system generates a second image of the target comprising a sharp portion corresponding to a location of the inclined face of the second structure, which gives a third piece of information on the distance between said target and said second exposure system in the direction Z. To this end, according to one possibility, the depth of field (DOF1) of the first exposure system is at least 10 times greater than the depth of field (DOF2) of the second exposure system. Moreover, according to another possibility, taken on its own or in combination with the preceding one, said optical system is arranged such that the optical path of the first exposure system and the optical path of the second exposure system have a common section including the image focal plane of the first exposure system and the image focal plane of the second exposure system. Moreover, according to another possibility, taken on its own or in combination with the preceding possibility or both preceding possibilities, the difference between the focal distance of the second exposure system and the focal distance of the first exposure system lies between the minimum distance and the maximum distance separating the reference face from the inclined face.

By this method, it is possible to have spatial geometrical information linked to the (first) reference face and to the inclined face or second reference face of the three-dimensional target, making it possible to deduce therefrom the relative position in the three spatial directions X, Y and Z between the first object and the second object. Previously, the referencing of the relative three-dimensional position between the target and the first object and the referencing of the relative three-dimensional position between the optical system and the second object will have been performed.

It is essential to note that, in one embodiment, the exposure or image generation by each exposure system of the optical system is performed without adjustment of the corresponding exposure system. Indeed, it is the relative position in the three directions X, Y and Z of the exposure system relative to the object that it is looking at (and therefore both the relative position of the first exposure system relative to the reference face of the target and the relative position of the second exposure system relative to the inclined face of the target) and the optical properties, and for example the very different depth of field of each exposure system of the optical system, which makes it possible to simultaneously generate two images, respectively of the reference face and of the inclined face. The analysis of these two images (even of two series of images) makes it possible to deduce therefrom information on the relative position in terms of X (this direction X corresponding for example to the height) and in terms of Y (this direction Y corresponding for example to the horizontal lateral offset) and in terms of Z (this direction Z corresponding for example to the main horizontal distance) between the target and the optical system, and thus the relative three-dimensional position between the first object which bears the three-dimensional target and the second object which bears the optical system.

In one embodiment, after the positioning of the three-dimensional target on the first object and the positioning of the optical system on the second object, an additional step is performed, of spatial referencing of the position in terms of X, Y and Z of the target relative to the first object by the optical system.

According to one possible provision, the second portion of the planar reference face is divided up according to a series of localised zones positioned in the first portion and the first image generated by the first exposure system makes it possible to identify the position of the localised zones of the second portion on the reference face, which gives a piece of information on the relative positon between said localised zones and the first exposure system making it possible to deduce the relative measurement according to the direction Y and according to the direction X.

REFERENCE NUMBERS USED IN THE FIGURES

X Vertical direction (first transverse axis)
Y Lateral horizontal direction (second transverse axis)
Z Main horizontal direction separating the first object from the second object (main axis)
C1 Diagonal
C2 Diagonal
C3 Centre
α Angle of the inclined face
R Arrow for the rotation of the tool-holder and of the target
10 Optical device
200 Three-dimensional target
202 Useful face
210 First structure
212 Reference face
214 First portion (reflective surface according to a diffuse reflection)
216 Second portion (reflective surface according to a specular reflection)
217 Localized zones
218 Aperture
219 Housing
220 Second structure
222 Inclined face
224 Relief elements
225 Specular elements
230 Transparent protection plate
231 Bottom wall
232 Top plate
233 Reflective layer
234 Cylindrical wall
100 Optical system
O Optical axis
102 Input face of the optical system
110 First exposure system
DOF1 Depth of field of the first exposure system
F1 Image focal plane of the first exposure system
112 First image acquisition system
116 Optical path of the first exposure system
120 Second exposure system
F2 Image focal plane of the second exposure system
DOF2 Depth of field of the second exposure system
122 Second image acquisition system
126 Optical path of the second exposure system
128 Optical module with catoptric optical system
129 Mirror
130 Third exposure system
140 Light source (lateral illumination)
300 Machining module
310 Tool-holder (first object)
312 Tool
314 Registration in terms of X on the tool-holder
316 Registration in terms of Y on the tool-holder
320 Work-holder or material spindle (second object)
322 Workpiece to be machined (material)

What is claimed is:

1. Machine-tool comprising a machining module equipped with a tool-holder and a work-holder, and an optical measuring device for the three-dimensional measurement of the relative position between said tool-holder and said work-holder, said optical measuring device comprising an optical system with an image acquisition system, mounted on the work-holder and a target mounted on the tool-holder and comprising a useful face forming a positioning reference that can be placed in the optical axis (O) of the optical system, wherein said optical measuring device is configured to make it possible, through a single step of exposure of the target by the optical system, to determine the three-dimensional relative position between the holder of the workpiece to be machined and the tool-holder.

2. Machine-tool according to claim 1, wherein the target is positioned such that the image focal plane of the optical system can be merged with the useful face of the target.

3. Machine-tool according to claim 1, wherein the target is a three-dimensional target comprising, on a useful face:
a first structure defining a planar reference face, and
a second structure having a face that is inclined relative to said planar reference face,
and wherein said optical system comprises a first exposure system and a second exposure system, wherein the difference between the focal distance of the second exposure system and the focal distance of the first exposure system lies between the minimum distance and the maximum distance separating the reference face from the inclined face.

4. Machine-tool according to claim 3, wherein said planar reference face is divided up between at least:
a first portion whose surface is reflective according to first reflection parameters, and
a second portion whose surface is reflective according to second reflection parameters different from the first reflection parameters.

5. Machine-tool according to claim 4, wherein the surface of said first portion is reflective according to a diffuse reflection, and the surface of said second portion is reflective according to a specular reflection.

6. Machine-tool according to claim 4, wherein said second portion is divided up according to a series of localized zones positioned in the first portion.

7. Machine-tool according to claim 3, wherein the surface of said inclined face has relief elements or else specular elements that are evenly distributed.

8. Machine-tool according to claim 6, wherein said localized zones define between them a geometrical figure belonging to at least one of the following: quadrilateral, parallelogram, rectangle, square, rhombus, regular polygon or circle.

9. Machine-tool according to claim 6, wherein said localized zones of said second portion are formed by islands or segments distributed in the first portion.

10. Machine-tool according to claim 3, wherein the first structure and the second structure are positioned on the useful face concentrically to one another.

11. Machine-tool according to claim 3, wherein the first structure surrounds the second structure.

12. Machine-tool according to claim 6, wherein said localized zones of the second portion of the first structure define a square which surrounds the second structure.

13. Machine-tool according to claim 3, wherein the first structure delimits an aperture for a housing housing said second structure.

14. Machine-tool according claim 13, wherein the second structure is positioned in said housing with the inclined face which is set back relative to the reference face of said first structure.

15. Machine-tool according to claim 3, wherein the surface of the inclined face of the second structure is striated, in particular the surface of the inclined face of the second structure is covered by one of the following elements: etched network, structured grid or network of specular lines.

16. Machine-tool according to claim 7, wherein said target also comprises a plate in a transparent material, in particular glass, covering the first structure and the second structure on the side of the useful face.

17. Machine-tool according to claim 3, wherein said optical measuring device also comprises a light source oriented towards the three-dimensional target, said light source being positioned in order to constitute a lateral illumination of the three-dimensional target.

18. Machine-tool according to claim 1, wherein the optical system comprises a first exposure system and a second exposure system, wherein:
the depth of field of the first exposure system is at least 10 times greater than the depth of field of the second exposure system, and
the optical system is arranged such that the optical path of the first exposure system and the optical path of the second exposure system have a common section placed on the optical axis (O) of the optical system and comprising the image focal plane of the first exposure system and the image focal plane of the second exposure system.

19. Machine-tool according to claim 18, wherein the optical system is arranged such that the optical path from the object passes through at least a portion of one out of the first and the second exposure systems before reaching the other of the first and the second exposure systems.

20. Machine-tool according to claim 18, wherein the first and the second exposure systems are positioned in parallel to one another and in that the optical system also comprises an optical module positioned between the first and the second exposure systems and configured to deflect some of the light rays passing through at least a part of one out of the first and the second exposure systems to the other out of the first and the second exposure systems.

21. Machine-tool according to claim 18, wherein the focal distance of the second exposure system is greater than the focal distance of the first exposure system.

22. Machine-tool according to claim 18, wherein the enlargement of the first exposure system is less than the enlargement of the second exposure system.

23. Machine-tool according to claim 18, wherein the depth of field (DOF1) of the first exposure system is greater than or equal to 0.8 millimetres.

24. Machine-tool according to claim 18, wherein the depth of field (DOF2) of the second exposure system is less than or equal to 0.1 millimetres.

25. Machine-tool according to claim 18, wherein the first exposure system is telecentric and the second exposure system is telecentric.

26. Machine-tool according to claim 3, wherein the optical system comprises a first exposure system and a second exposure system, wherein:
the depth of field of the first exposure system is at least 10 times greater than the depth of field of the second exposure system, and
the optical system is arranged such that the optical path of the first exposure system and the optical path of the second exposure system have a common section placed on the optical axis (O) of the optical system and comprising the image focal plane of the first exposure system and the image focal plane of the second exposure system, and wherein:
the first exposure system is configured such that its image focal plane can correspond to the reference face of the first structure, and
the second exposure system is configured such that its image focal plane can be secant with the inclined face of the three-dimensional target.

27. Machine-tool according to claim 18, wherein the optical device also comprises a third exposure system positioned on the tool-holder and configured to register the orientation of the useful face of the target and/or the angular orientation of the tool-holder.

28. Method for three-dimensional optical measurement according to three orthogonal directions X, Y and Z in the three-dimensional space of a machine-tool, between a tool-holder and a work-holder that are aligned and remote from one another in the main direction Z, wherein:
- an optical system is provided with an image acquisition system,
- said optical system is mounted on the work-holder,
- a target is provided comprising a useful face forming a positioning reference,
- said target is mounted on the tool-holder,
- the tool-holder and the work-holder are positioned such that the target can be placed in the optical axis (O) of the optical system,
- a single step of exposure of the target is performed with the optical system positioned so as to cooperate with the target, whereby the three-dimensional relative position between the holder of the workpiece to be machined and the tool-holder is determined.

29. Measurement method according to claim 28, wherein, in the exposure step, the optical system and the target are positioned such that the image focal plane of the optical system can be merged with the useful face of the target.

30. Measurement method according to claim 29, wherein:
- said target is three-dimensional, and comprises, on a useful face:
  - a first structure defining a planar reference face divided up between at least:
    - a first portion whose surface is reflective according to a diffuse reflection, and
    - a second portion whose surface is reflective according to a specular reflection, and
  - a second structure having a face that is inclined relative to said planar reference face,
- said optical system comprises a first exposure system and a second exposure system, wherein:
  - the depth of field of the first exposure system is at least 10 times greater than the depth of field of the second exposure system, and
  - said optical system is arranged on the one hand such that the optical path of the first exposure system and the optical path of the second exposure system have a common section comprising the image focal plane of the first exposure system and the image focal plane of the second exposure system, and, on the other hand, such that the difference between the focal distance of the second exposure system and the focal distance of the first exposure system lies between the minimum distance and the maximum distance separating the reference face from the inclined face,
- the tool-holder and the work-holder are positioned such that, on the one hand, the focal distance of the first exposure system can place the image focus of the first exposure system on the first structure of the target and that, on the other hand, the focal distance of the second exposure system can place the image focus of the second exposure system on the second structure of the target,
- in said step of exposure with the optical system, at least one exposure is taken simultaneously with the first exposure system of the optical system and with the second exposure system of the optical system, whereby, for each exposure by the optical system, on the one hand, the first exposure system generates a first image of the target making it possible to identify, on the reference face, the position of the second portion relative to the first portion, which gives, firstly, a first piece of information on the relative position according to the direction X of the target relative to the first exposure system and, secondly, a second piece of information on the relative position between the target and the first exposure system according to the direction Y, and, on the other hand, the second exposure system generates a second image of the target comprising a sharp portion corresponding to a location of the inclined face of the second structure, which gives a third piece of information on the distance between said target and said second exposure system according to the direction Z.

31. Measurement method according to claim 30, wherein said second portion of the planar reference face is divided up according to a series of localized zones positioned in the first portion and wherein, when said first exposure system generates a first image of the target, the position of the localized zones of the second portion is identified on the reference face, which gives a piece of information on the relative position between said localized zones and the first exposure system making it possible to deduce the relative measurement according to the direction Y and according to the direction X.

* * * * *